Oct. 9, 1962 R. C. ZIMMERMAN 3,057,065
GASKET CUTTER
Filed Dec. 2, 1955
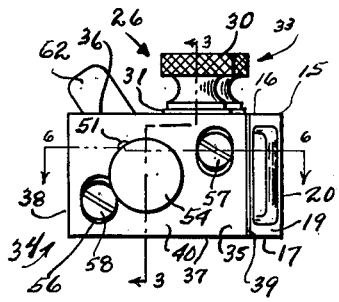
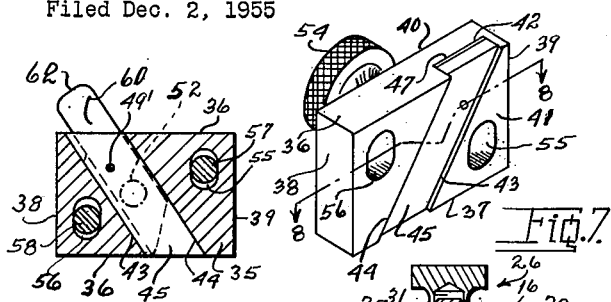
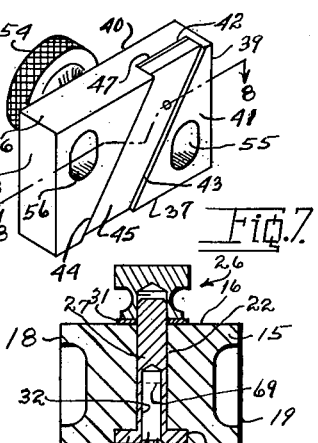
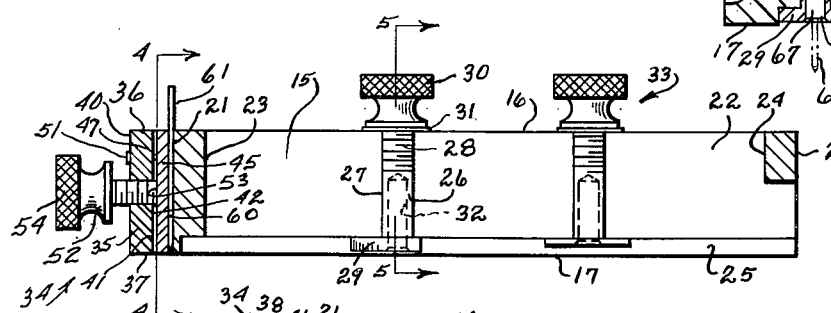
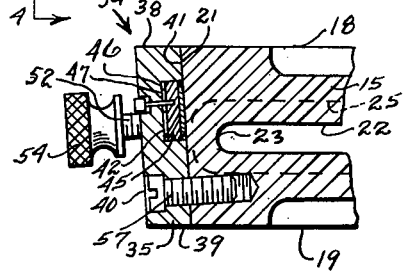
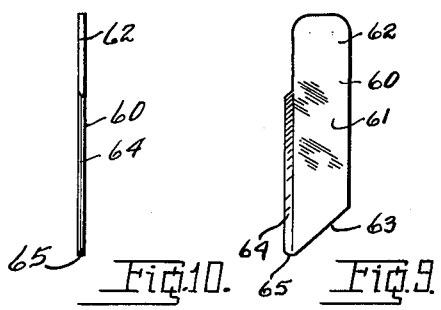
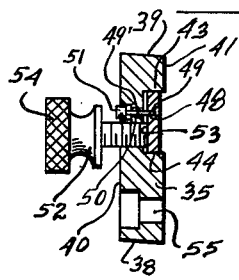
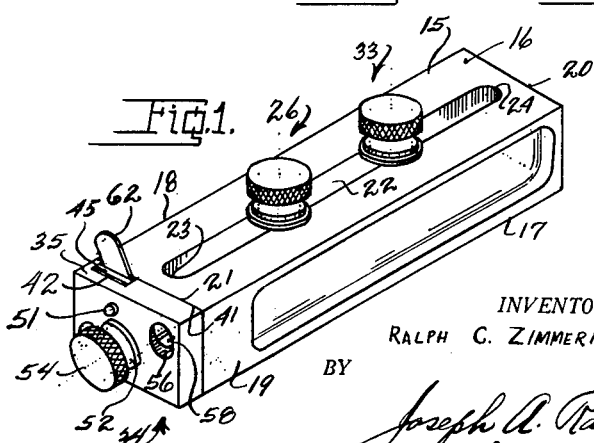
INVENTOR.
RALPH C. ZIMMERMAN
BY Joseph A. Rave
Attorney

United States Patent Office 3,057,065
Patented Oct. 9, 1962

1

3,057,065
GASKET CUTTER
Ralph C. Zimmerman, Norwood, Ohio, assignor to The Zimmerman Packing Company, Norwood, Ohio, a corporation of Ohio
Filed Dec. 2, 1955, Ser. No. 550,697
8 Claims. (Cl. 30—329)

This invention relates to improvements in a cutting device, or tool particularly to a device for cutting discs, rings, and the like, from sheet material of any and all kinds.

The cutting device of the present invention is an improvement over that disclosed in the Charles H. Zimmerman Patent No. 2,134,069, which issued on October 25, 1938, and the cutting device or tool of the present invention will probably see its principal use in the cutting of gasket material in formation of gaskets.

The cutting device as disclosed in the above identified patent has several weaknesses in that it is constructed to use extremely thin cutting blades which due to their thinness has the tendency to be readily broken, thereby, rendering the tool useless until a new cutting blade is obtained. A further weakness in the device of the patent is the fact that the cutting blade requires a screw driver in order that it may be clamped or its position adjusted, an inconvenient and time consumed operation.

The cutting device of the present invention overcomes the specific weaknesses above mentioned and at the same time has inherent advantages over the structure of said patent.

It is, therefore, the principal object of the present invention the provision of a disc, ring, or the like, cutting device or tool in which the cutting blade may be securely clamped in operative position without the use of extraneous tools, such as a screw driver or the like.

Another object of this invention is the provision of a cutting device or tool wherein the cutting blade may be secured in operative position by a clamping mechanism under the control of a thumb nut and, therefore, a manually actuable clamping screw.

A still further object of this invention is the provision of a cutting device or tool that may have its cutting blade secured in operative position by manually operable clamping means forming an integral part of the cutting device as a whole.

A further object of the present invention is the provision of an attachment for the cutting device as disclosed in the above identified patent and as presently on the market, whereby said cutting device or tool may be adapted for having its cutter blade secured in operative positions through a manually actuable thumb screw.

It is also an object of this invention to provide an improved cutter blade which will withstand the lateral stresses and strains normal to a cutter blade in a cutting device or tool of the present invention.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

2

In the drawings:
FIG. 1 is a perspective view of the cutting device or tool of the present invention.
FIG. 2 is an end elevation of said cutting device or tool as seen from the left hand end of FIG. 1.
FIG. 3 is a longitudinal sectional view through the cutting device or tool as seen from line 3—3 on FIG. 2.
FIG. 4 is a transverse sectional view through the cutting device or tool as seen from line 4—4 on FIG. 3.
FIG. 5 is a transverse sectional view through the cutting device or tool as seen from line 5—5 on said FIG. 3.
FIG. 6 is a fragmentary, horizontal, sectional view through one end of the cutting device or tool as seen from line 6—6 on FIG. 2 and rotated 90°.
FIG. 7 is a perspective view of the clamping mechanism or head, per se, which is secured to the body member of the cutting device.
FIG. 8 is a transverse sectional view through the said clamping mechanism or head as seen from line 8—8 on FIG. 7.
FIG. 9 is an elevational view of an improved cutting blade which forms a detail of the present invention.
FIG. 10 is an edge elevational view of the cutting blade as seen from the left hand edge of FIG. 9.

Throughout the several views of the drawings, similar reference characters are employed to denote the same or similar parts.

The cutting device or tool of the present invention comprises a body member 15 rectangular in cross section and provided with a top 16, a bottom 17 and longitudinal sides 18 and 19. The body member 15 has considerable length by comparison with its height and width. The body member 15 has a rear end 20 substantially normal to its top, bottom and sides and a head end 21 which inclines to the sides 18 and 19, as clearly illustrated in FIG. 6; and the purpose of which inclination will be presently made clear.

Extending through the said body member from the top 16 to the bottom 17 thereof, is a slot 22 which terminates inwardly of the head end 21 as at 23, and to all intents and purposes terminates inwardly of the rear end 20, as at 24. Upwardly of the bottom 17, a recess 25 is formed which has a width greater than the width of the slot 22 as illustrated in FIG. 5. The lower end of the slot 22 and the recess 25 break through the rear end 20 of the body member 15 for the purpose of securing to the said body member extension bars, whereby the capacity of the cutting tool may be enlarged, all of which is not disclosed in this application but which is clearly disclosed in the above identified patent and is readily understood by those familiar with the gasket cutter of the above patent.

Disposed in the slot 22 of the body member 20 is a centering pin assembly, indicated in its entirety by the reference numeral 26, and comprising post 27, circular in cross section, having its upper end threaded as at 28 and having a head 29 at its lower end. The head 29 is adapted to be received in the recess 25 while the post 27 is adapted to extend through the slot 22 to have its threaded end projected upwardly of the body member top 16 to receive a clamping nut 30. Disposed below the clamping nut 30 is a washer 31. The post 27 upwardly of its lower end and the lower end of its head 29 is provided with a socket 32.

If desired, a second centering pin assembly, indicated in its entirety by the reference numeral 33, may be provided in the slot 22 behind the post 26 for the purpose of enabling the tool to make two separate cuts, as for example, the external diameter and the hole or aperture in a ring gasket, all of which will be clearly set forth hereinafter.

Secured to the head end, particularly the face 21, is a cutting blade clamping mechanism indicated in its entirety by the reference numeral 34.

The clamping mechanism 34 comprises a block 35 of the same height and width as the body 15 with said block having a top 36, a bottom 37 and sides 38 and 39. The said block 35 is likewise provided with a forward face 40 and a rear face 41. The rear face 41 is adapted to being brought into face contact with the forward face 21 of the body member 15.

The clamping block 35 has let into its rear face 41 a groove or slot 42 which extends diagonally or angularly of the block, that is, from one corner of its top 36 toward the opposite corner of its bottom 37. The slot 42 is formed by parallel side faces 43 and 44 with the face 43 extending at such an angle to the block that its bottom end breaks through the clamping block bottom 37 at a point substantially on the central line through the body member 15 particularly the longitudinal center of the body bottom 17, as shown most clearly on FIG. 4.

Disposed in the clamping block diagonal or angular slot 42 is a clamping plate 45 of a width substantially equal to the width of the slot but of a thickness somewhat less than the depth of said slot, wherefore space may be provided ahead of the said clamping plate 45, when mounted in position with its rear face 41 against the body member forward face 21, as well as space 46 behind it and the base 47 of the slot or groove 42.

The clamping plate 45 is retained against vertical movement in the slot 42, by means of a retaining pin 48 which has its inner end 48 driven into an aperture or socket 49 in the said plate 45. The shank 49' of the pin 48 is disposed in an enlarged aperture 50 through the block 35 in axial alignment with the aperture or socket 45 in the clamping plate.

The pin is provided with an enlarged head 51 which prevents the said pin from being passed or pulled through the clamping head block aperture 50 with said head 51 engaging either the outer face 40 of the said block 45 or engaging the base of a counterbore or recess let into said block outer face 40, and which construction is illustrated in the drawings in FIGS. 6 and 8.

Threaded through the clamping head block 35 is an actuating or thumb screw 52 having the inner end of its screw shank 53 in abutment with the outer face of the clamp plate 42 and with said thumb screw 52 having at its outer end, exteriorly of the cutting device or tool, an actuating head 54 which is preferably knurled.

The clamping head block 35 is provided on each side of the actuating or thumb screw 52 with an elongated counterbore 55 and 56 through each of which, respectively, extends a clamping or attaching screw, respectively, 57 and 58 and through which clamping or attaching screws the said clamping head block 35 and parts carried thereby are secured to the cutting device body 15.

The thickness of the clamping plate 45 with respect to the depth of the slot or groove 42 is such that a cutting blade may be readily accommodated therein. The specific cutting blade for the mechanism illustrated in the drawings is disclosed in FIGS. 9 and 10.

The cutting blade 60 comprises a length of material of substantially uniform thickness from side to side and end to end and includes a body portion 61 having a length substantially equal to the length of the sides 43 and 44 of the slot or groove 42, and material beyond the length of the groove 42 to supply what may be termed a handle or handling portion 62. The lower or bottom end of the blade is upwardly inclined as at 63 and the body portion 61 of the blade has one edge thereof sharpened or made keen as is 64. It should be noted that the keen edge 64 stops where the handle portion 62 of the blade commences.

The lower corner of the blade is rounded as at 65 so that a sharp point does not exist, as would be the case if the keen edge 64 of the blade were permitted to extend and be intersected by the inclined edge 63.

In practice the blade 60 is positioned to have its keen edge on the inclined side 43 of the clamping head groove 42, wherefore said keen edge may be projected below the bottom 17 of the cutter body at a point on the longitudinal center of said cutter body.

FIG. 4 very clearly illustrates the relationship of the parts when the blade 60 is retracted to its fully retracted position, that is a position with the keen edge 64 and its point 65 fully above the bottom 17 of the cutter body. It will be noted that with the parts in this position, the upper end of the blade handle 62 is, at least, in line with the adjacent vertical edge, side 18, of the cutter body so that no interference with the positioning of the assembled cutting device or tool on its said side 18 is afforded and at the same time danger to the operator or user of the cutting device or tool is minimized since the said blade does not project laterally beyond the said side of the tool but only above its upper surface or top 16.

By providing the blade 60 with the rounded cutting nose 65 it, immediately upon projection below the body 15, has considerable width as distinguished from a cutting blade which would have a point resulting from the intersection of two straight lines, such as the continuation of the keen edge 64 and the inclined bottom end 63 of the blade. By this construction, there is provided a blade that is very rugged and will not be readily broken upon use since the material through which the cutting blade is actuated is frequently backed up by material that is harder or tougher than the material being cut since such backing material is repeatedly employed as a cutting surface while the material being cut is cut but once.

In use the material to be cut is provided with an aperture at the center or axis about which a disc, ring, aperture, or the like, is to be formed, whereupon the reduced pointed end 66 of a centering pin 67 is inserted through the said material aperture into the backing up material. The said pin is inserted through the material being cut until the shoulder 68 of the centering pin 67 is resting on the said material being cut and with said pin having its enlarged body portion 69 upstanding normal to the material. The centering pin assembly 26 is then adjusted longitudinally of the slot 22 toward or from the cutting blade 60 until the exact distance of the aperture, or disc, to be cut, exists between the projecting point 65 of the blade 60 and the center of the centering pin assembly post socket 32. If a ring gasket is being cut, then the centering pin assembly 26 is adjusted to the radius of the ring aperture and the centering pin assembly 33 adjusted to the radius of the ring exterior diameter. At this time the cutting implement or tool through its centering pin assembly 26 is placed over the centering pin 67 with said centering pin assembly post socket receiving the enlarged body portion 69 of said centering pin. The tool is pushed toward the upper surface of the material being cut until the projecting end or rounded edge 65 of the blade 60 is forced into and through the said material. It is to be understood, and as intimated above, that the blade 60 had previously been adjusted through the slot 42 to a position where the said projecting end or round edge 65 projected below the body bottom 17 an amount to slightly exceed the thickness of the material being cut but only to the point of clearing the lower edge of said material.

In order that the cutting blade may be inserted or adjusted through the slot 42 the clamping screw 52 was backed away from the clamping plate 45 to permit the retraction of the said clamping plate 45, from the face 21 of the body 15 sufficiently to permit unrestricted movement of the blade 62 between the said clamp plate 45 and face 21 of the body 15. It will be readily understood that the release of pressure on the clamp plate 45 did not permit the movement of the plate longitudinally of the groove 42 but only permitted a lateral, outward, shifting of said clamp plate, namely, from the face 21 toward the base 47 of the said groove, since the retaining pin retains or prevents the clamp plate from vertical or axial movement.

After the longitudinal adjustment of the blade 60 to its desired position through its handle 62 the said blade may be clamped by actuating the clamping screw 52 in the opposite direction or toward the body end 21.

The cutting implement or tool during the cutting of a disc, aperture, ring, or the like, is actuated in a clockwise direction as seen in FIG. 1 about the vertical axis of the centering pin assembly 26 and the angle of inclination of the face 21 is such as to cause the blade to properly track as the tool is being actuated about the axis of the centering pin 67, thereby, providing the disc, aperture, ring, or the like, with an edge or cut face that is normal to the surfaces of the material being cut.

From the foregoing, it is believed now evident that there has been provided a cutting device or tool, particularly for cutting discs, rings, apertures, or the like, that accompanies the objects initially set forth.

I claim:

1. In a gasket cutter of the class described the combination of a body member having a plane head end against which a cutter blade is to be clamped, a separable clamp block secured to the body member plane head end, said clamp block having an inner face and an outer face with said inner face in face contact with the body member plane head end, said clamp block having a groove formed therein inwardly of its inner face with said groove having a given depth, and means carried by said clamp block of less thickness than the groove depth operable in said groove for clamping a cutter blade therein against the body member head end.

2. In a gasket cutter of the class described the combination of a body member having a head end against which a cutter blade is to be clamped, a separable clamp block carried by said gasket cutter head end and having an inner and an outer surface, a groove in the clamp block inwardly of its inner surface, said groove having a depth to accommodate a cutter blade and a clamp plate, a clamp plate in said groove between the base of the groove and the cutter blade, and means carried by the clamp block for actuating the clamp plate relative to the groove toward the body member head end for securing the blade between said clamp plate and the said body member head end.

3. In a gasket cutter of the class described the combination of a body member having a head end against which a cutter blade is to be clamped, a separable clamp block carried by said gasket cutter head end and having an inner and an outer surface, a groove in the clamp block inwardly of its inner surface, said groove having a depth to accommodate a cutter blade and a clamp plate, a clamp plate in said groove between the base of the groove and the cutter blade, and a thumb screw threaded through the clamp block with its inner end in abutment with the clamp plate actuating the clamp plate relative to the groove toward the body member head end for securing the blade between said clamp plate and the said body member head end.

4. In a gasket cutter of the class described the combination of a body member having a head end against which a cutter blade is to be clamped, a separable clamp block carried by said gasket cutter head end and having an inner and an outer surface, a groove in the clamp block inwardly of its inner surface, said groove having a depth to accommodate a cutter blade and a clamp plate, a clamp plate in said groove between the base of the groove and the cutter blade, a thumb screw threaded through the clamp block with its inner end in abutment with the clamp plate actuating the clamp plate relative to the groove toward the body member head end for securing the blade between said clamp plate and the said body member head end, and means retaining the clamp plate within the groove against movement except as effected by the clamp screw.

5. In a gasket cutter of the class described the combination of a body member of considerable length in an axial direction and having a head end with a plane face angularly related to the body member axis and against which body member plane face a cutter blade is clamped, a separable clamp block outwardly of the body member head end face and permanently secured thereto, said clamp block having a groove formed therein of a given depth outwardly of the body member head end face, a clamp plate and a cutter blade within said groove and having a combined thickness somewhat less than the depth of the clamp block groove, said cutter blade having a keen edge adapted to lie adjacent one side of the groove and said groove and blade being angularly related to the cutter block to have the keen edge of the blade project below the body member at a point on the body member axis, and means carried by the clamp block for actuating the clamp plate and blade through the cutter block groove into clamping engagement with the body member plane face.

6. In a gasket cutter of the class described the combination of a body member of considerable length in an axial direction and having a head end with a plane face angularly related to the body member axis and against which body member plane face a cutter blade is clamped, a separable clamp block outwardly of the body member head end face and permanently secured thereto, said clamp block having a groove formed therein of a given depth outwardly of the body member head end face, a clamp plate and a cutter blade within said groove and having a combined thickness somewhat less than the depth of the clamp block groove, said cutter blade having a keen edge adapted to lie adjacent one side of the groove and said groove and blade being angularly related to the cutter block to have the keen edge of the blade project below the body member at a point on the body member axis, a thumb screw threadedly carried by the clamp block with its inner end in an abutment with the clamp plate, actuating the clamp plate and blade through the cutter block groove into clamping engagement with the body member plane face, and means carried by the clamp block to prevent movement of the clamp plate except as effected by the thumb screw.

7. As an article of manufacture a clamping head for a gasket cutter comprising a clamp block having an inner and an outer face, a groove in said cutter block inwardly of its inner face and adapted to receive a gasket cutter blade, a clamp plate within said groove operable in a direction between the clamp block inner and outer faces, a clamp screw threadedly carried by the clamp block having its inner end in abutment with the clamp plate actuating said clamp plate in its groove, and a pin carried by the clamp plate freely projecting through the clamp block to the outer face thereof for preventing movement of the clamp plate in the groove except as effected by the clamp screw.

8. As an article of manufacture a cutting blade formed from a length of blade material with said blade having a body portion of greater length than width and uniform thickness, said blade lengthwise edges constitute the sides thereof and with one side edge sharpened or keen and the other side edge blunt and said keen and blunt side edges parallel throughout their length, said blade having a bottom edge upwardly inclined and provided with a rounded corner where said keen side edge and bottom edge intersect, and said blade having a handle portion upwardly of the body portion and formed of said blade material having its side edges parallel with one another with one of said handle side edges blunt and as a continuation of the body portion blunt side edge and with said handle other side edge also blunt and located behind the body portion keen edge.

References Cited in the file of this patent

UNITED STATES PATENTS

| | | | |
|---|---|---|---|
| D. 171,522 | Zimmerman | Feb. 16, 1954 |
| 527,175 | Hurd | Oct. 9, 1894 |
| 547,906 | Welshimer et al. | Oct. 15, 1895 |
| 1,005,193 | Gates | Oct. 10, 1911 |
| 1,135,987 | Beecher | Apr. 20, 1915 |
| 1,187,615 | Frees | June 20, 1916 |
| 1,188,779 | Hodge | June 27, 1916 |
| 1,325,101 | Masters | Dec. 16, 1919 |
| 1,901,764 | Mosca | Mar. 14, 1933 |
| 1,984,500 | Tautz | Dec. 18, 1934 |
| 2,134,069 | Zimmerman | Oct. 25, 1938 |
| 2,209,751 | Wulff | July 30, 1940 |
| 2,778,423 | Zimmerman | Jan. 22, 1957 |